May 3, 1960
E. F. KATZ
2,934,961
GYROSCOPE COMPENSATION TORQUE DEVICE
Filed Nov. 24, 1958
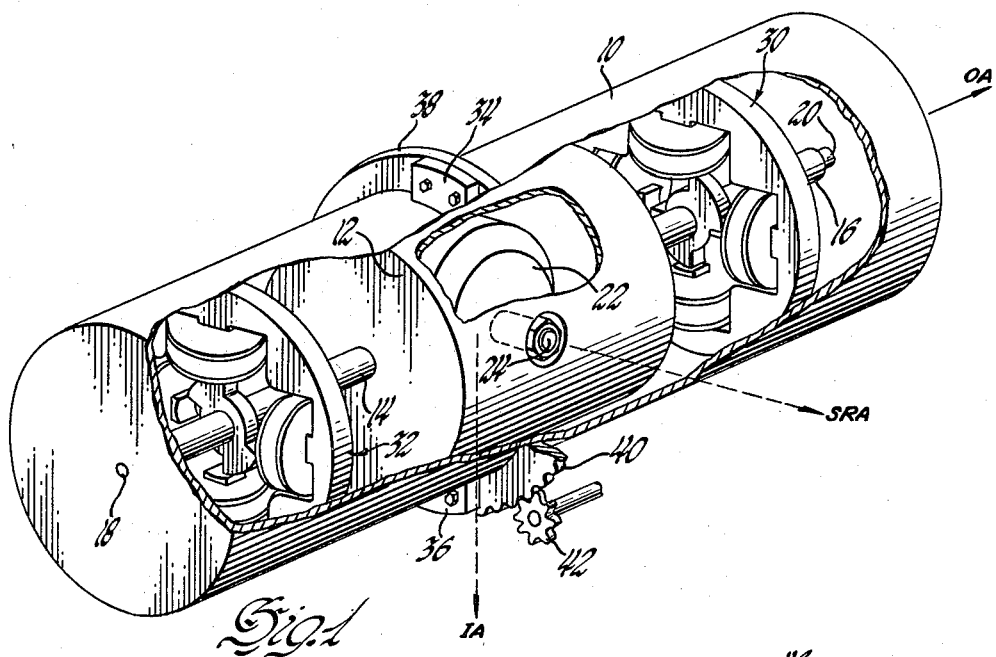
Fig.1
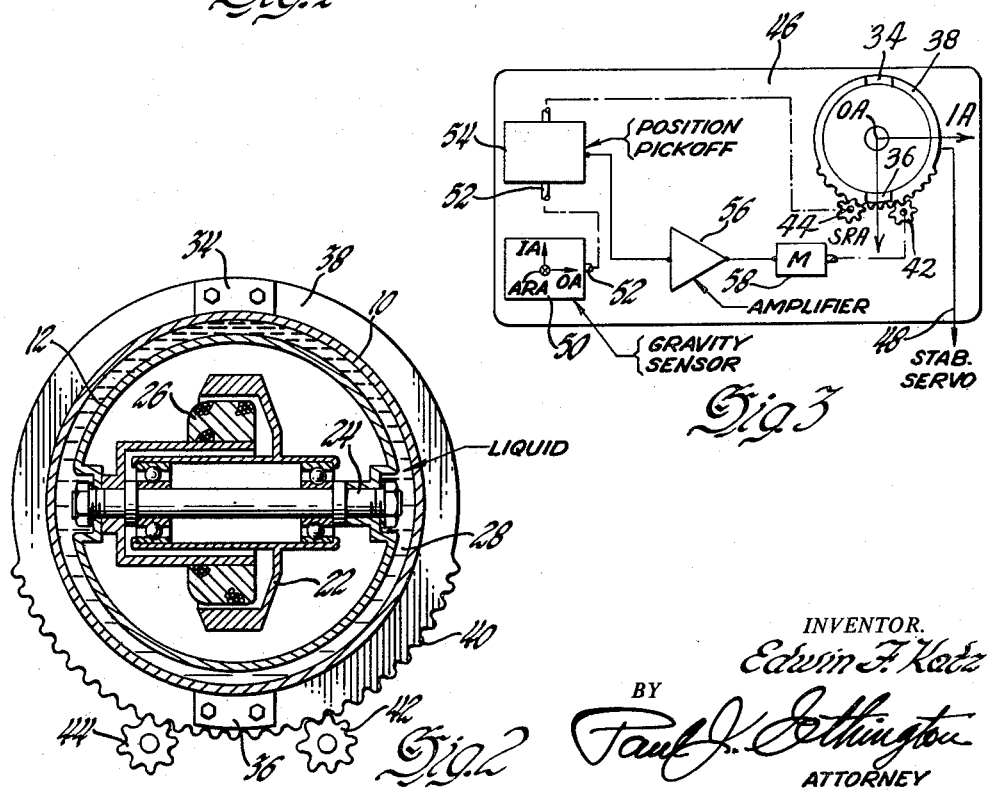
Fig.3
Fig.2
INVENTOR.
Edwin F. Katz
BY
Paul J. Ethington
ATTORNEY United States Patent Office 2,934,961
Patented May 3, 1960

2,934,961

GYROSCOPE COMPENSATION TORQUE DEVICE

Edwin F. Katz, Milwaukee, Wis., assignor to General Motors Corporation, Detroit, Mich., a corporation of Delaware Application November 24, 1958, Serial No. 776,076

8 Claims. (Cl. 74—5.4)

This invention relates to gyroscopes and more particularly to an improved device for developing compensation torques for gyroscopes.

In general, gyroscopes are subject to certain undesired torques about the output axis which act to change the reference orientation of the gyroscope at a rate dependent upon the magnitude of such torques. The undesired torques may arise from various sources and may be constant or variable as functions of acceleration and they are sources of gyroscope inaccuracy and instability. These undesired torques are characterized herein as "drift torques." For example, in the single degree of freedom integrating gyroscope which is commonly used for platform stabilization in navigation systems, the sources of drift torques include mass and compliance unbalance which vary with acceleration and residual torques of constant value about the output axis. The mass unbalance torque arises from machining and assembly tolerances of the float assembly and the compliance unbalance arises from uneqal elasticity of the gyroscope rotor support and bearings. Residual torques may arise from a slight net force of the gyroscope motor lead wires, and reaction force from the signal generator exerted about the output axis. To reduce these drift torques to a minimum value, it has been a common practice to provide compensation torques about the output axis by an electromagnetic torque motor such as a torque microsyn. The compensation torque may be of predetermined value to account for the constant residual torque and an average of the predicted values of the unbalance torques. However, the accuracy and stability of the compensation torque achieved by a torque motor are dependent upon precise regulation of current to the motor and such regulation is difficult to attain in practice.

In accordance with this invention, the compensation torque is developed by permanent magnet means in an arrangement which permits a high degree of accuracy and stability. This is accomplished by a permanent magnet which is coupled by magnetic flux linkage with a magnetic member on the output gimbal member of the gyroscope and angularly positioned so that the compensation torque exerted thereby is equal and opposite to the drift torque of the gyroscope. Accordingly, both accuracy and stability of compensation depend upon physical position of the magnet which may be readily established with precision.

A more complete understanding of this invention may be had from the detailed description which follows taken with the accompanying drawings in which:

Figure 1 is a perspective view, with parts broken away, of a gyroscope embodying the invention.

Figure 2 is a cross-sectional view of the gyroscope.

Figure 3 is a system for automatic adjustment of the compensation torque device.

Referring now to the drawings, there is shown an illustrative embodiment of the invention in a single degree of freedom integrating gyroscope of the type commonly used for stabilization in navigation systems. The gyroscope comprises a casing 10 which contains a gimbal member in the form of a cylindrical float 12 having a pair of axially aligned shafts or trunnions 14 and 16 affixed thereto which are supported in the casing 10 by a pair of pivot bearings 18 and 20 for rotation about the gyroscope output axis OA. The rotor 22 of the gyroscope is disposed within the float 12 and mounted upon a shaft 24 by a pair of preloaded bearings. The shaft 24 is secured at either end to the float and defines the spin reference axis SRA of the gyroscope. The rotor 22 is driven at high speed by a stator 26 rigidly secured to the float by a flanged collar. A viscous liquid 28 fills the casing 10 and provides viscous damping and buoyant support for the float 12 to relieve the radial load on the bearings 18 and 20. A signal generator or microsyn 30 has its stator mounted on the casing 10 and its rotor mounted on the shaft 16 for rotation therewith to develop an output signal voltage corresponding in phase and amplitude to the direction and magnitude of angular displacement of the gimbal or float assembly. The gyroscope responds to angular rates about the input axis IA, which is mutually perpendicular to the spin reference and output axes, to develop a corresponding angular rate about the output axis OA so that the signal voltage developed by the microsyn 30 corresponds to the time integral of the input angular rate.

The gyroscope drift torques result in displacement of the float assembly about the output axis and the signal microsyn develops a signal voltage which is indistinguishable from that developed by an angular rate about the input axis. Accordingly, the drift torques result in inaccuracy of the gyroscope and decreases its long term stability in space. In order to reduce the effect of the gyroscope drift torques, compensation torques must be applied to the gimbal or float assembly.

In the prior art, this is accomplished by a torque microsyn 32 which is energized with a current of a computed value necessary to develop the correct compensation. In certain applications of this invention, the torque microsyn 32 may be utilized for developing input torques which vary as a function of time. In other applications, the torque microsyn 32 may be deleted.

In accordance with this invention, the compensation torques are developed by a pair of permanent magnets 34 and 36 which exert a magnetic force upon the rotor 22, which is constructed of magnetic material and may be laminated to minimize eddy currents therein. The magnets are suitably disposed externally of the casing 10 upon a ring 38 and to enhance the flux linkage with the rotor, the casing, ring, and float are constructed of nonmagnetic material. The ring 38 is angularly adjustable with respect to the casing to vary the effective lever arm and flux linkage to establish the desired torque. Adjustment is accomplished by a gear segment 40 on the ring 38 which meshes with a drive pinion 42. It will now be appreciated that the compensation torque may be developed by the magnetic force of one or more of the permanent magnets developed by flux linkage with any magnetic material which is mounted upon the gimbal member or float 12 and displaced from the output axis to provide a torque arm.

The support ring 38 may be angularly positioned with reference to the casing 10 to obtain a desired value of compensation torque by apparatus of the type represented diagrammatically in Figure 3. The gyroscope casing 10 is secured to a stabilized platform 46 which is adapted to maintain a level or horizontal attitude under the control of a stabilization servo (not shown). With the input axis IA pointed east in the horizontal plane, the rotation of the earth does not produce any angular rate about the gyroscope input axis and thus there is no displacement of the float assembly about the output axis in response to earth rate. Any output signal voltage from the microsyn 30 is due to the drift torques of the gyroscope and is applied through conductor 48 to the stabilization servo as indicated. The stabilization servo thus displaces the platform 46 from its level attitude due to the drift of the gyroscope. This displacement of the platform 46 is detected by a local vertical or gravity sensor 50, suitably of the constrained pendulum type, having its arm reference axis ARA extending downwardly and its input axis IA extending in a direction normal to the output axis of the gyroscope. Thus, the gravity sensor 50 produces an angular displacement of its output shaft 52 about its output axis OA which corresponds to the displacement of the platform from the level attitude. The shaft 52 displaces one input element of a position pick-off 54 which develops an error voltage corresponding to the angular displacement. This output voltage is applied to a servo amplifier 56 which energizes a servo motor 58 coupled with the driving pinion 42. The ring 38 is displaced in accordance with the sense and magnitude of displacement of the platform 46 from the level attitude. At the same time, the follow-up pinion 44, which is coupled to the other input element of the pick-off 54, causes the error voltage of the pick-off to be reduced to null. Accordingly, the permanent magnets 34 and 36 are adjustably positioned about the output axis of the gyroscope until the compensation torque developed thereby is equal and opposite to the drift torques of the gyroscope.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. A gyroscope comprising a support member, a gimbal assembly including a gimbal member having trunnions supported by the support member for rotation about an output axis, a rotor mounted in said gimbal member for rotation about a spin reference axis extending transversely of said output axis, means for imparting rotation to said rotor, said gimbal assembly being constructed, in part, of magnetic material spaced from said output axis, and a permanent magnet on the support member adjacent the magnetic material in magnetic coupling therewith, said permanent magnet being positioned to exert a fixed compensation torque equal and opposite the drift torque about the output axis of the gyroscope.

2. A gyroscope comprising a support member, a gimbal assembly including a gimbal member having trunnions supported by the support member for rotation about an output axis, a rotor mounted in said gimbal member for rotation about a spin reference axis extending transversely of said output axis, means for imparting rotation to said rotor whereby angular rates about an input axis mutually perpendicular to the output and spin reference axes produce an angular displacement of the gimbal assembly about the output axis, said gimbal assembly being subject to drift torques about the output axis tending to produce undesired angular displacement of the gimbal assembly, said gimbal assembly being constructed, in part, of magnetic material spaced from said output axis, and a permanent magnet adjustably mounted on the support member adjacent the magnetic material in magnetic coupling therewith to exert a compensation torque about the output axis in opposition to the drift torques.

3. A gyroscope comprising a support member, a gimbal assembly including a gimbal member having trunnions supported by the support member for rotation about an output axis, a rotor mounted in said gimbal member for rotation about a spin reference axis extending transversely of said output axis, means for imparting rotation to said rotor, said gimbal assembly being constructed, in part, of magnetic material spaced from said output axis, a mounting member disposed on the support member for angular adjustment about the output axis, and a permanent magnet on the mounting member adjacent the magnetic material in magnetic coupling therewith to exert a compensation torque about the output axis.

4. A gyroscope comprising a closed casing, a gimbal assembly including a cylindrical float having trunnions supported by the casing for rotation about an output axis, a rotor shaft mounted within said float and extending transversely of said output axis, a rotor supported on said shaft for rotation about a spin reference axis, a stator supported within said float for imparting rotation to said rotor, a viscous liquid filling said casing and providing buoyant support and viscous damping of the gimbal assembly, said gimbal assembly being subject to drift torques about the output axis tending to produce angular displacement of the gimbal assembly, said gimbal assembly being constructed, in part, of magnetic material spaced from said output axis, and a permanent magnet mounted on the support casing adjacent the magnetic material in magnetic coupling therewith to exert a compensation torque about the output axis in opposition to the drift torques.

5. A gyroscope comprising a closed casing, a gimbal assembly including a cylindrical float having trunnions supported by the casing for rotation about an output axis, a rotor shaft mounted within said float and extending transversely of said output axis, a rotor of magnetic material supported on said shaft for rotation about a spin reference axis, a stator supported by said float and disposed interiorly of said rotor for imparting rotation thereto, a viscous liquid filling said casing and providing buoyant support and viscous damping of the gimbal assembly, said gimbal assembly being subject to drift torques about the output axis tending to produce angular displacement of the gimbal assembly, said casing and float being constructed of non-magnetic material, and a permanent magnet mounted on the casing adjacent the float in magnetic coupling with the rotor to exert a compensation torque about the output axis in opposition to the drift torques.

6. A gyroscope comprising a closed casing, a gimbal assembly including a cylindrical float having trunnions supported by the casing for rotation about an output axis, a rotor shaft mounted within said float and extending transversely of said output axis, a rotor of magnetic material supported on said shaft for rotation about a spin reference axis, a stator supported by said float and disposed interiorly of said rotor for imparting rotation thereto, a viscous liquid filling said casing and providing buoyant support and viscous damping of the gimbal assembly, said gimbal assembly being subject to drift torques about the output axis tending to produce angular displacement of the gimbal assembly, said casing and float being constructed of non-magnetic material, a mounting ring supported coaxially and exteriorly of said casing for angular adjustment thereon, and a permanent magnet mounted on the mounting ring adjacent the float in magnetic coupling with the rotor to exert a compensation torque about the output axis in opposition to the drift torques.

7. A gyroscope comprising a closed casing, a gimbal assembly including a cylindrical float having trunnions supported by the casing for rotation about an output axis, a rotor shaft mounted within said float and extending transversely of said output axis, a rotor of magnetic material supported on said shaft for rotation about a spin reference axis, a stator supported by said float and disposed interiorly of said rotor for imparting rotation thereto, a viscous liquid filling said casing and providing buoyant support and viscous damping of the gimbal assembly, said gimbal assembly being subject to drift torques about the output axis tending to produce angular displacement of the gimbal assembly, said casing and float being constructed of non-magnetic material, a mounting ring supported coaxially and exteriorly of said casing for angular adjustment thereon, and a pair of permanent magnets mounted on the mounting ring at diametrically opposite positions adjacent the float in magnetic coupling with the rotor to exert a compensation torque about the output axis in opposition to the drift torques.

8. A gyroscope comprising a closed casing, a gimbal assembly including a cylindrical float having trunnions supported by the casing for rotation about an output axis, a rotor shaft mounted within said float and extending transversely of said output axis, a rotor of magnetic material supported on said shaft for rotation about a spin reference axis, a stator supported by said float and disposed interiorly of said rotor for imparting rotation thereto, a signal generator having a stator mounted on the casing and a rotor mounted on one of the trunnions, a torque motor having a stator mounted on the case and a rotor mounted on the other of the trunnions, a viscous liquid filling said casing and providing buoyant support and viscous damping of the gimbal assembly, said gimbal assembly being subject to drift torques about the output axis tending to produce angular displacement of the gimbal assembly, said casing and float being constructed of non-magnetic material, a mounting ring supported coaxially and exteriorly of said casing for angular adjustment thereon, and a pair of permanent magnets mounted on the mounting ring at diametrically opposite positions adjacent the float in magnetic coupling with the rotor to exert a compensation torque about the output axis in opposition to the drift torques.

References Cited in the file of this patent

UNITED STATES PATENTS

| | | |
|---|---|---|
| 2,752,790 | Draper | July 3, 1956 |
| 2,835,132 | Vacquier | May 20, 1958 |
| 2,864,255 | Stern et al. | Dec. 16, 1958 |